US006980764B2

(12) United States Patent
Otsuka et al.

(10) Patent No.: US 6,980,764 B2
(45) Date of Patent: Dec. 27, 2005

(54) BELT-TYPE FIXING DEVICE

(75) Inventors: Yutaka Otsuka, Toyokawa (JP); Satoru Yoneda, Toyohashi (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 94 days.

(21) Appl. No.: 10/805,368

(22) Filed: Mar. 22, 2004

(65) Prior Publication Data

US 2004/0184851 A1 Sep. 23, 2004

(51) Int. Cl.[7] .................. G01V 3/00
(52) U.S. Cl. .................. 399/329; 399/328
(58) Field of Search .................. 399/328–330, 399/249, 69; 347/156; 432/60

(56) References Cited

U.S. PATENT DOCUMENTS

| | | | | |
|---|---|---|---|---|
| 6,219,512 | B1 * | 4/2001 | Saitoh | 399/249 |
| 6,304,741 | B1 * | 10/2001 | Tange | 399/328 |
| 6,567,639 | B1 * | 5/2003 | Murata et al. | 399/329 |
| 6,628,916 | B2 * | 9/2003 | Yasui et al. | 399/329 |
| 6,799,003 | B2 * | 9/2004 | Kishimoto et al. | 399/69 |

FOREIGN PATENT DOCUMENTS

| | | |
|---|---|---|
| JP | 3-228076 | 10/1991 |
| JP | 8-337997 | 12/1996 |
| JP | 10-228195 | 8/1998 |
| JP | 11-133776 | 5/1999 |
| JP | 2001-356625 | 12/2001 |
| JP | 2002-148979 | 5/2002 |

* cited by examiner

*Primary Examiner*—Brij B. Shrivastav
(74) *Attorney, Agent, or Firm*—Morrison & Foerster LLP

(57) ABSTRACT

A belt-type fixing device is provided that allows reduction in driving torque for a fixing belt without deteriorating performance of heat transfer from a heating roller to the fixing belt.

The belt-type fixing device of the present invention has an endless-sheet-like fixing belt to be heated that is wound around a rotatable heating roller and around a nip forming member fixed so as to be incapable of rotating, and has a pressurizing roller that can be driven to rotate and that is in pressure contact with the nip forming member with the fixing belt interposed between. Contact part between the fixing belt and the pressurizing roller forms a fixing nip. For a tension load W [N] on the fixing belt that is driven and rotated by the pressurizing roller, and a width L [m] of the fixing belt, W/L is set in a range from 18.0 to 107.9 [N/m].

9 Claims, 3 Drawing Sheets

BELT-TYPE FIXING DEVICE

RELATED APPLICATION

This application are based on Japanese Patent Applications Nos. 2003-77070 and 2004-72493, the contents of which are incorporated herein by reference.

BACKGROUND OF THE INVENTION

The present invention relates to a belt-type fixing device that is used in an electrophotographic image forming apparatus.

In Japanese Patent Laid-Open Publication HEI 08-334997 has been disclosed a belt-type fixing device 70 shown in FIG. 4. The belt-type fixing device 70 has an endless-sheet-like fixing belt 72. The fixing belt 72 is wound around a heating roller 76 having a heater lamp 74 as a heat source therein and around a fixing roller 78 having an elastic layer on an outer circumference thereof. A pressurizing roller 80 that is driven to rotate in a direction of an arrow C is in pressure contact with the fixing roller 78 with the fixing belt 72 interposed between, and contact part between the pressurizing roller 80 and the fixing belt 72 forms a fixing nip. A donor roller 82 is in pressure contact with an outer surface of the fixing belt 72 between the heating roller 76 and the fixing roller 78. The fixing belt 72 is pressed inward by the donor roller 82, and a contact surface between the fixing belt 72 and the heating roller 76 is thereby enlarged stably, so that heat transfer from the heating roller 76 to the fixing belt 72 is efficiently effected.

Any of the heating roller 76, the fixing roller 78, and the donor roller 82 can be rotated. The pressurizing roller 80 is driven to rotate in the direction of the arrow C, and the fixing belt 72 is thereby rotated in a direction of an arrow D. A thermistor 84 that is temperature detecting means is provided so as to be in contact with an outer circumference of the heating roller 76. By on-off control over the heater lamp 74 on basis of temperatures detected by the thermistor 84, temperatures of the heating roller 76 and the fixing belt 72 can be kept at specified values.

In the belt-type fixing device 70, however, a tension in the fixing belt 72 is increased and a driving torque for the pressurizing roller 80 is concomitantly increased. As a result, stable conveyability with the fixing belt 72 is not easy to achieve.

Provided a nip forming member that is fixed so as not to rotate is used in place of the rotatable fixing roller 78, particularly, a tension in the fixing belt 72 is further increased by sliding friction of an inner surface of the fixing belt 72 on the nip forming member. In this case, an excessive load for driving the fixing belt 72 tends to cause slip between the fixing belt 72 and the pressurizing roller 80, so that it becomes difficult to achieve stable conveyability with the fixing belt 72. With a reduction in the tension in the fixing belt 72, on the other hand, a frictional force against the nip forming member is decreased and a load for driving the fixing belt 72 is thereby decreased. Without provision of the donor roller 82, however, a force of pressing the fixing belt 72 against the heating roller 76 is lost, and it is therefore necessary to stabilize an area of the contact surface between the fixing belt 72 and the heating roller 76.

SUMMARY OF THE INVENTION

Accordingly, in a first aspect of the present invention, there is provided a belt-type fixing device comprising an endless-sheet-like fixing belt to be heated that is wound around a supporting member which is provided so as to be capable or incapable of rotating and around a nip forming member which is fixed so as to be incapable of rotating, and a pressurizing roller that can be driven to rotate and that is in pressure contact with the nip forming member with the fixing belt interposed between, wherein contact part between the fixing belt and the pressurizing roller forms a fixing nip, and for a tension load W [N] on the fixing belt which is driven and rotated by the pressurizing roller, and a width L [m] of the fixing belt, W/L is set in a range from 18.0 to 107.9 [N/m].

In the belt-type fixing device of the first aspect of the invention, a mean pressure in the fixing nip is preferably in a range from 50 to 250 kPa.

In the belt-type fixing device of the first aspect of the invention, a surface of the nip forming member that is opposite to the pressurizing roller may be configured as a curved surface extending along an outer circumferential surface of the pressurizing roller so that a pressure distribution in the fixing nip is made generally flat with respect to a paper feeding direction.

In this configuration, a radius R of curvature of the curved surface of the nip forming member preferably satisfies the following expression:

$$\text{radius of pressurizing roller} \leq R \leq \text{radius of pressurizing roller} \times 1.3.$$

In the belt-type fixing device of the first aspect of the invention, the supporting member is preferably a rotatable heating roller having a heat source, and an arbitrary point on an inner surface of the fixing belt abuts on the heating roller preferably for 0.2 second or longer in one revolution of the fixing belt.

In a second aspect of the present invention, there is provided a belt-type fixing device for fixing a toner image on a paper, the belt-type fixing device comprising:

an endless-sheet-like belt member, a pressurizing roller which has an elasticity and on which the paper is passed through a fixing nip that is contact part between the pressurizing roller and an outer circumferential surface of the belt member, a nip forming member that is harder than the pressurizing roller, that is positioned inside the belt member, that relatively presses the belt member against the pressurizing roller, and that has a pressing surface opposite to the pressurizing roller and formed of a curved surface extending along an outer circumferential surface of the pressurizing roller, and a spring that provides the belt member with a tension such that, for a tension load W [N] and a width L [m] of the belt member, W/L is in a range from 18.0 to 107.9 [N/m].

In the belt-type fixing device of the second aspect of the invention, the tension that is imparted to the belt member by the springs is preferably in the range from 18.0 to 107.9 [N/m].

In the belt-type fixing device of the second aspect of the invention, the tension that is imparted to the belt member by the springs is more preferably in a range from 28.8 to 107.9 [N/m].

In the belt-type fixing device of the second aspect of the invention, the pressurizing roller may be driven to rotate, and the belt member may follow the pressurizing roller so as to rotate.

In accordance with the belt-type fixing device of the invention, for the tension load on the fixing belt represented as W [N] and the width of the fixing belt represented as L

[m], the tension load is set so that W/L is in the range from 18.0 to 107.9 [N/m]. That is, W/L is made lower than values of W/L in conventional belt-type fixing devices (e.g., 143.9 N/m). Although a member supporting the fixing belt from inside is not a rotating member but the nip forming member that is fixed so as to be incapable of rotating, a resistance of sliding friction between the nip forming member and the fixing belt is thus decreased, so that a driving torque for the pressurizing roller required for stable rotation of the fixing belt can be reduced.

Provided that the supporting member around which the fixing belt is wound is the rotatable heating roller having the heat source, a reduction in the tension load on the fixing belt causes a decrease in a contact area between the heating roller and the fixing belt. An amount of the decrease, however, is restricted within a range that exerts only slight influence upon a quantity of heat that is transferred from the heating roller to fixing belt. Therefore, stable function of the heat transfer can be maintained without being deteriorated.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
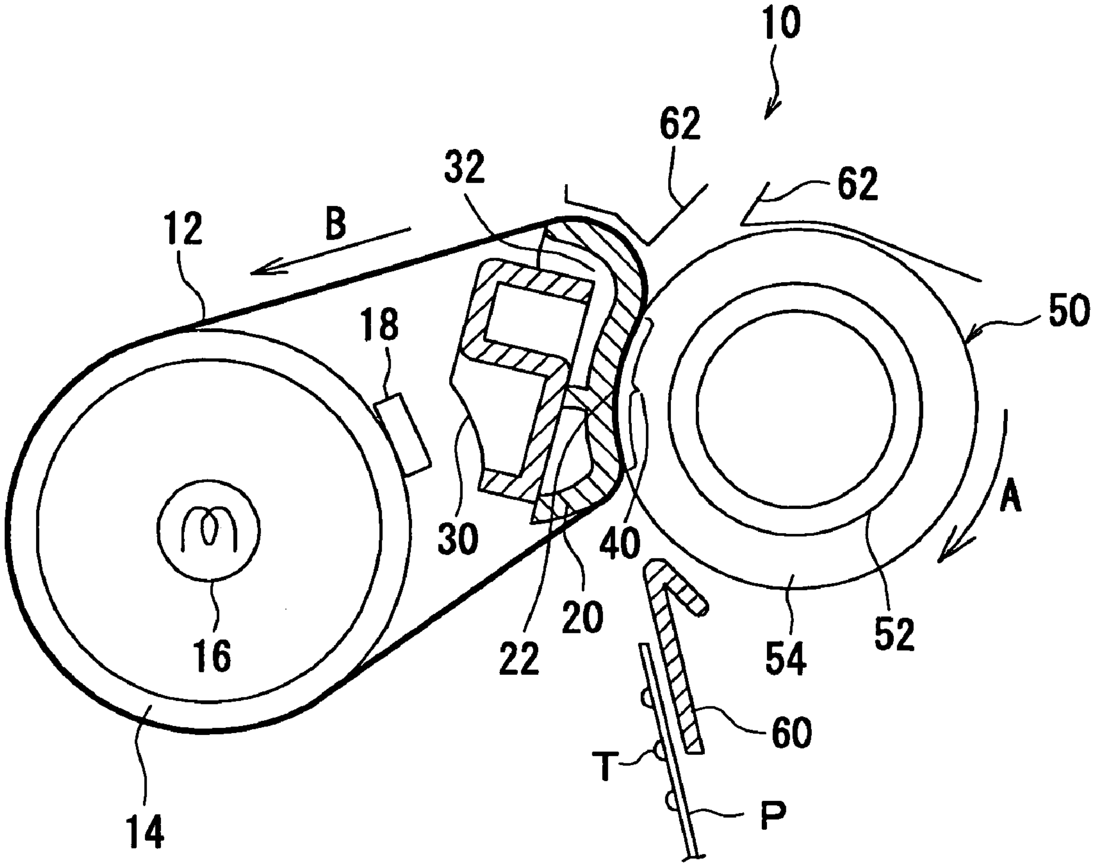
FIG. 1 shows a schematic configuration of a belt-type fixing device.

FIG. 1 shows a belt-type fixing device 10 of the embodiment of the invention. The belt-type fixing device 10 has an endless-sheet-like fixing belt 12. The fixing belt 12 has a width of 278 mm along a direction of depth in FIG. 1, and has an outside diameter of 65 mm in form of a cylinder, for example. The fixing belt 12 is configured so that a 70 μm-thick base material composed of polyimide, a 200 μm-thick elastic layer composed of silicone rubber, and a 30 μm-thick mold release layer composed of PFA (copolymer of tetrafluoroethylene and perfluoroalkyl vinylether) have been superimposed in order of mention from inside.

The fixing belt 12 is wound around a heating roller (a supporting member) 14 that is rotatably supported at both ends thereof and around a nip forming member 20 that is fixed in a position away from the heating roller 14 so that the member 20 cannot be rotated. The heating roller 14 is composed of a cylindrical metal tube having an outside diameter of 35 mm, for example, and has a heater lamp 16 as a heat source therein.

The fixing belt 12 is heated by the heating roller 14 heated from inside by the heater lamp 16. A thermistor 18 is provided so as to be in contact with the heating roller 14. Temperatures of the heating roller 14 and the fixing belt 12 can be set at desired values by on-off control over the heater lamp 16 according to a temperature detected by the thermistor 18.

The nip forming member 20 is provided inside the fixing belt 12, and a pressurizing roller 50 is in pressure contact with the nip forming member 20 with the fixing belt 12 interposed between. Thus contact part between the fixing belt 12 and the pressurizing roller 50 forms a fixing nip 40.

The pressurizing roller 50 has an outside diameter of 30 mm, for example, and has a 4 mm-thick elastic layer 54 composed of rubber or sponge on an outer circumference of a metal core 52 that is like a metal cylinder. A 40 μm-thick mold release layer (not shown) is formed on a surface of the elastic layer 54. The pressurizing roller 50 is driven by a motor not shown to rotate in a direction of an arrow A. It is to be noted that an auxiliary heater may be provided inside the pressurizing roller 50.

The elastic layer 54 of the pressurizing roller 50 has a length of 240 mm, for example, along an axial direction (a direction of depth in FIG. 1). The fixing belt 12 has a width larger than the length of the elastic layer 54 so that the whole length of the elastic layer 54 of the pressurizing roller 50 is in pressure contact with the fixing belt 12. The nip forming member 20 extends so as to support an overall width of the fixing belt 12.

The nip forming member 20 is formed of material (such as resin and ceramic) that has a low heat conductivity and that is harder than the elastic layer 54 of the pressurizing roller 50. A low friction layer (not shown) composed of PFA, PTFE (polytetrafluoroethylene) or the like, for example, is formed on a surface of the member 20 that is in contact with an inner surface of the fixing belt 12. In order to reduce a frictional resistance between the nip forming body 20 and the fixing belt 12, heat-resistant lubricant such as fluorine-based grease may be applied onto the inner surface of the fixing belt 12.

A surface (pressing surface) 22 of the nip forming member 20 that is opposite to the pressurizing roller 50 is configured as a curved surface that extends along an outer circumferential surface of the pressurizing roller 50. Specifically, a radius R of curvature of the opposite surface 22 of the nip forming member 20 is set to e.g., 15.4 mm slightly larger than a radius (e.g., 15 mm) of curvature of the outer circumferential surface of the pressurizing roller 50. In such a configuration, a length of the fixing nip 40 with respect to a circumferential direction of the pressurizing roller 50 is about 9 mm (hereinbelow, the length will be referred to as "nip width"). The opposite surface 22 of the nip forming member 20 is formed of one and the same material continuously. For example, the material may be resin material that forms the nip forming member 20 or may be rubber material, fluorine coating material or the like that covers the opposite surface 22 of the nip forming member 20.

The radius R of curvature of the opposite surface 22 of the nip forming member 20 preferably satisfies a following expression. Thus the surface 22 of the nip forming member 20 that is opposite to the pressurizing roller 50 is configured as the curved surface extending along the outer circumferential surface of the pressurizing roller 50, and a pressure distribution in the fixing nip 40 is thereby made generally flat with respect to a paper feeding direction.

$$\text{Radius of pressurizing roller} \leqq R \leqq \text{Radius of pressurizing roller} \times 1.3 \quad \text{(Expression 1)}$$

At back of the nip forming member 20, a reinforcing member 30 that is made of a metal plate bent into a cross-sectional shape like a letter "S" is provided so as to extend in a longitudinal direction of the nip forming member 20. The reinforcing member 30 is intended for minimizing flexure of the nip forming member 20 in directions orthogonal to the longitudinal direction which flexure is caused by pressure of the pressurizing roller 50. Between the nip forming member 20 and the reinforcing member 30 is provided a space 32 intended for heat insulation. It is to be noted that the reinforcing member is not limited to that made of a metal plate but may be a solid metal rod, for example.

A plunging guide 60 is provided under the fixing nip 40, and a paper P having an unfixed toner image T formed on a surface thereof is introduced into the fixing nip 40 by the plunging guide 60. Above the fixing nip 40 is provided a pair of ejection guides 62. The ejection guides 62 serve to subserviently guide the paper P ejected from the fixing nip 40 and serve to separate the paper P tending to attach to the fixing belt 12 or the pressurizing roller 50.

Figure 2:
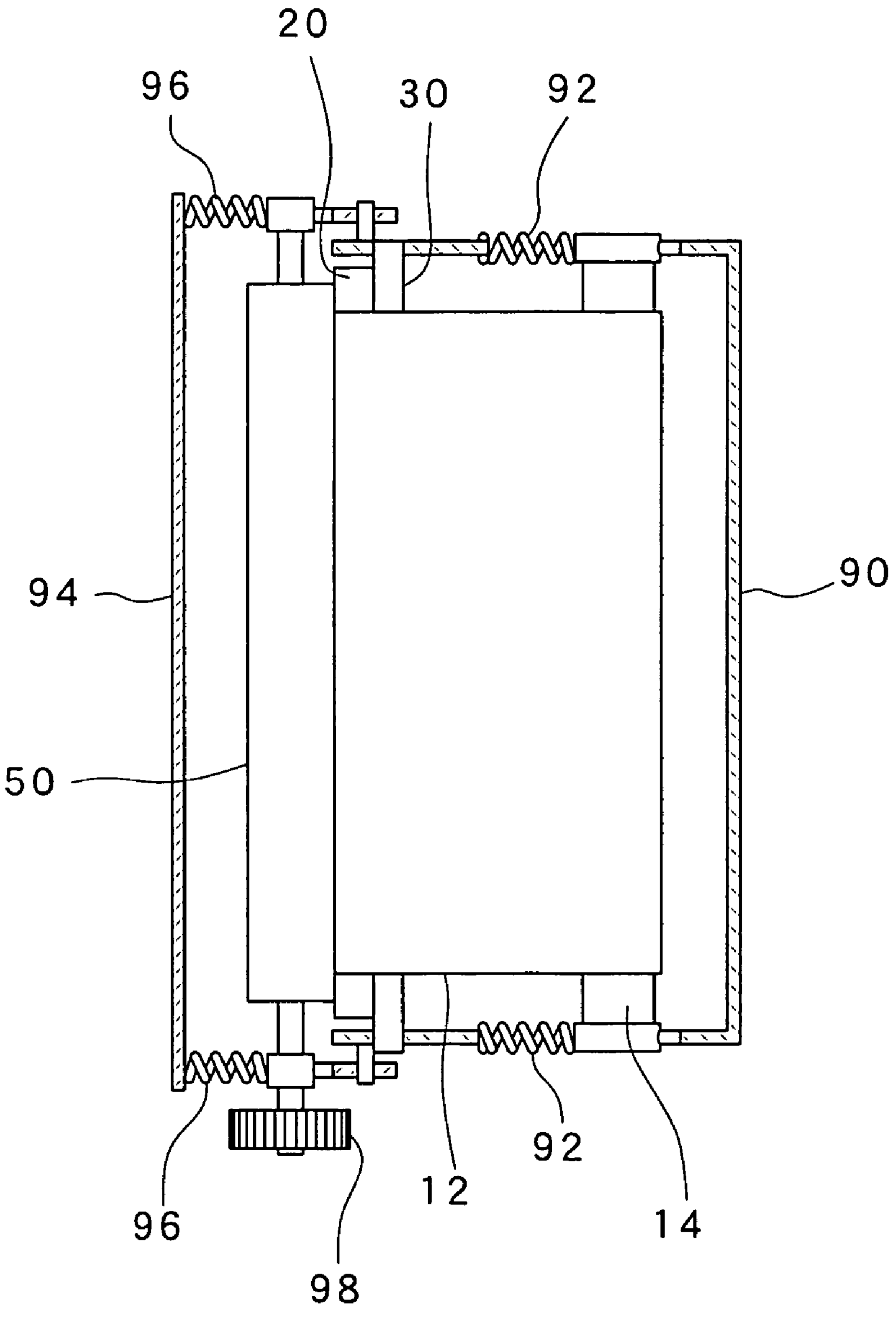
FIG. 2 is a top plan view of the belt-type fixing device of FIG. 1.

As shown in FIG. 2, both ends of the reinforcing member 30 are fixed to and supported by a first frame 90 having a section shaped like a square bracket. The nip forming member 20 is fixed to the reinforcing member 30. The heating roller 14 is rotatably supported at both ends by the first frame 90, and the both ends are biased by springs 92 in a direction such that the heating roller 14 goes away from the nip forming member 20. Thus a tension is imparted to the fixing belt 12. For the tension load represented as W [N] and the width of the fixing belt 12 represented as L [m], W/L is set in a range from 18.0 to 107.9 [N/m], more preferably in a range from 28.8 to 107.9 [N/m], and further preferably in a range from 36.0 to 107.9 [N/m].

The pressurizing roller 50 is rotatably supported at both ends by a second frame 94 having a section shaped like a square bracket, and the both ends are biased toward the nip forming member 20 by springs 96. A sum of loads applied to the both ends of the pressurizing roller 50 in this arrangement makes a nip load in the fixing nip 40, which load is set in a range from 10 to 530 N. A nip load of 530 N, for example, with a nip width of about 9 mm and with a longitudinal nip length of about 240 mm provides a mean pressure in the fixing nip 40 of about 250 kPa. When a recording medium such as OHP having a poor gas permeability is passed through the fixing nip 40 for fixation of a toner image on the recording medium, water contained in the toner and in the recording medium may be vaporized by heat transferred in the fixing nip 40 so as to cause bubble-like image noise. Prevention of occurrence of such phenomenon requires a nip pressure of 250 kPa at maximum. An actual operational range of the mean pressure in the fixing nip 40 is of 50 kPa to 250 kPa. That is because the mean pressure smaller than 50 kPa prevents stable transmission of a driving force of the pressurizing roller 50 to the fixing belt 12 and because the mean pressure larger than 250 kPa only increases a driving load on the fixing belt 12 and thus necessitates a motor having a larger electric power consumption.

A driving gear 98 is fixed to a shaft of the pressurizing roller 50 and is coupled to a motor not shown so that the pressurizing roller 50 is driven to rotate.

When the pressurizing roller 50 is driven to rotate in the direction of the arrow A, in the belt-type fixing device 10 with the above configuration, the fixing belt 12 concomitantly moves and rotates in a direction of an arrow B at a speed of 150 mm/sec, for example, while sliding on the surface of the nip forming member 20. While the fixing belt 12 is rotated in such a manner, an overall periphery of the fixing belt 12 is heated by the heating roller 14 and temperatures of the fixing belt thereby rise to a specified fixation temperature (e.g., 180° C.).

After the fixing belt 12 is heated so as to have the specified fixation temperature, the paper P having the unfixed toner image T formed on the surface thereof is introduced into the fixing nip 40 from lower side. Thus the toner image T is fixed onto the paper P while the paper is passed through the fixing nip 40. The paper P having passed through the fixing nip 40 is conveyed upward while being guided subserviently by the ejection guides 62, and is then ejected to outside of the image forming apparatus.

In accordance with the belt-type fixing device 10 of the embodiment, for the tension load on the fixing belt 12 represented as W [N] and the width of the fixing belt represented as L [m], the tension load is set so that W/L is in a range from 18.0 to 107.9 [N/m], as described above. That is, W/L is made lower than values (e.g., 143.9 N/m) of W/L in conventional belt-type fixing devices. Although a member supporting the fixing belt 12 from inside is not a rotating member but the nip forming member 20 that is fixed so as to be incapable of rotating, a resistance of sliding friction between the nip forming member 20 and the fixing belt 12 is thus decreased, so that a driving torque for the pressurizing roller 50 required for stable rotation of the fixing belt 12 can be reduced.

Such a reduction in the tension load on the fixing belt 12 causes a decrease in a contact area between the heating roller 14 and the fixing belt 12; however, an amount of the decrease in the embodiment is restricted within a range that exerts little influence upon a quantity of heat that is transferred from the heating roller 14 to fixing belt 12. Therefore, stable function of the heat transfer can be maintained without being deteriorated.

The surface 22 of the nip forming member 20 that is opposite to the pressurizing roller 50 is configured as the curved surface extending along the outer circumferential surface of the pressurizing roller 50, and the pressure distribution in the fixing nip 40 is thereby made generally flat with respect to the paper feeding direction, so that paper conveying velocities are made uniform throughout the fixing nip 40. Thus stress is prevented from acting on a paper passing through the fixing nip 40, and image noise such as image blur, wrinkles of paper and the like are thereby prevented from occurring.

The fixing nip having a desired width can be obtained with adequate setting of a width of the nip forming member 22. Accordingly, the fixing nip 40 having a large width, for example, of 9 mm is easily obtained by a comparatively low nip pressure, in contrast to a conventional fixing device in which a fixing nip is formed between two rollers and which requires a considerably large contact pressure for obtainment of a wide fixing nip. Thus nip time required for fixation is ensured by the wide fixing nip 40, so that increase in system speed of the image forming apparatus can be addressed.

Figure 4:
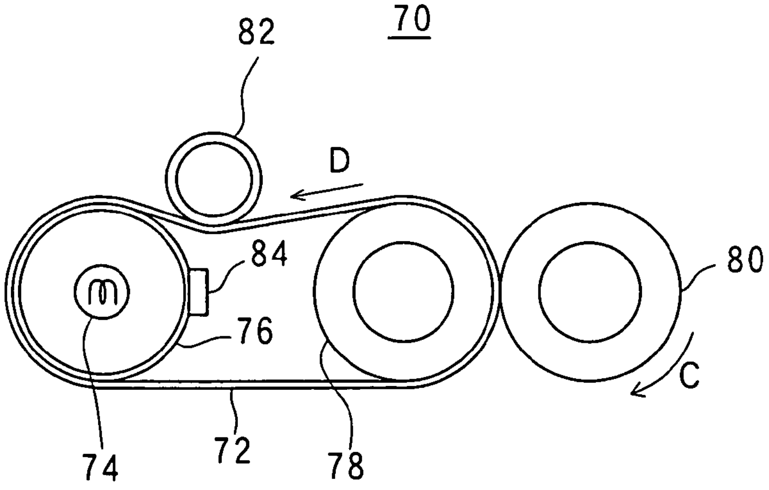
Fig.4 PRIOR ART
FIG. 4 is a diagram showing an example of a conventional belt-type fixing device.

The fixing device 10 can be miniaturized and a circumferential length of the fixing belt 12 can be shortened by substitution of the nip forming member for a fixing roller having an elastic layer on an outer circumference thereof which roller has been used in conventional belt-type fixing devices as shown in FIG. 4. Thus the fixing belt 12 can be shortened so that a heat capacity of the fixing belt 12 and heat release from the fixing belt 12 are reduced. Furthermore, substitution of the nip forming member, e.g., made of resin with a small heat capacity for a fixing roller having an elastic layer with a large heat capacity increases a rate at which temperatures rise in the fixing belt 12 undergoing heat transfer from the heating roller 14. As a result, warm-up time at a start and recovery time from printing-standby status can be shortened.

On condition that a pressure contact load of the pressurizing roller 50 is variable in accordance with a type of a paper P in the belt-type fixing device 10 of the embodiment, positions of an entrance and an exit of the fixing nip 40 do not change so much as those in a conventional fixing device in which a fixing nip is formed between two rollers. Therefore, deterioration is prevented in performance on plunge of papers P into the fixing nip 40 and performance on separation of papers P ejected from the fixing nip 40.

Hereinbelow, an experiment carried out with the belt-type fixing device 10 of the embodiment will be described with reference to a graph shown in FIG. 3.

In this experiment, initially, a relation was examined between tension loads on the fixing belt 12 and lengths of wound part of the fixing belt 12 abutting on the heating roller 14. A change in the tension load causes a change in tightness of the fixing belt 12 and thus causes a change in a contact area between the fixing belt 12 and the heating roller 14. A length of the wound part of the fixing belt 12 abutting on the heating roller 14 as seen looking at the belt-type fixing device 10 from a lateral position as shown in FIG. 1 may be substituted for the contact area, because the fixing belt 12 abuts on the heating roller 14 uniformly with respect to a longitudinal direction. As shown by a thick line in FIG. 3, an increase in the tension load involves an increase in the length of the wound part, in a range of the tension load from 5 to 10 N (wherein the tension load W/the fixing belt width L ranges from 18.0 to 36.0 N/m). In a range of the tension load exceeding 10 N (wherein a value of W/L exceeds 36.0 N/m), however, the length of the wound part hardly changes and thus an ideal state is brought about in which the fixing belt 12 and the heating roller 14 are in stable contact with each other.

When the length of the wound part of the fixing belt 12 abutting on the heating roller 14 is small, a quantity of heat is decreased that is transferred from the heating roller 14 to the fixing belt 12 being driven to be rotated at a specified speed, so that it takes much time for temperatures of the fixing belt 12 to rise to a specified fixation temperature. In the belt-type fixing device 10 of the embodiment, it has been found by an experiment that a temperature rising rate in the fixing belt 12 starts becoming comparatively low with the length of the wound part having become less than 30 mm and that the temperature rising rate in the fixing belt 12 starts becoming extremely low with the length of the wound part having become less than 20 mm. As shown as a thermal followability ensuring range in FIG. 3, therefore, the tension load on the fixing belt 12 is required to be at least 5 N (the value of W/L is 18.0 N/m) or larger that results in the lengths of the wound part not less than 20 mm. More preferably, the tension load on the fixing belt 12 is 8 N (the value of W/L is 28.8 N/m) or larger that results in the lengths of the wound part not less than 30 mm. Further preferably, the tension load is 10 N (the value of W/L is 36.0 N/m) or larger in which the length of the wound part hardly changes.

On condition that the system speed, i.e., a rotational speed of the fixing belt 12 is 150 mm/sec, the length of the wound part is preferably 30 mm or larger. This means that an arbitrary point on an inner surface of the fixing belt 12 abuts on the heating roller 14 preferably for 0.2 second or longer in one revolution of the fixing belt 12.

Figure 3:
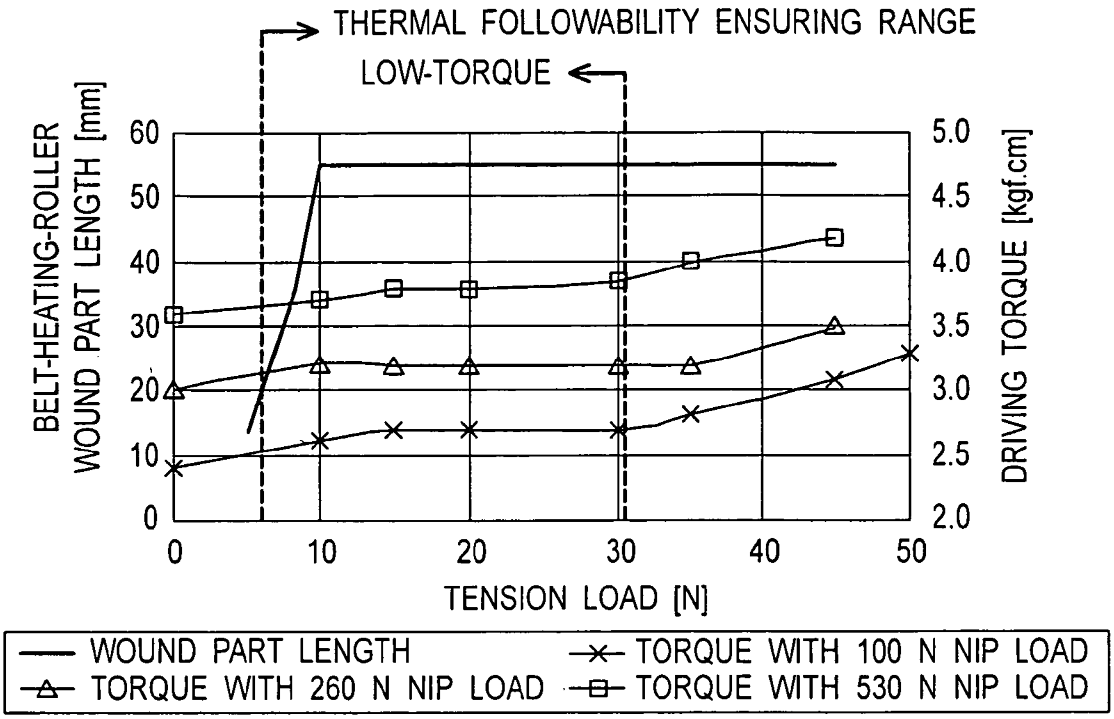
FIG. 3 is a graph illustrating relations between tension loads, lengths of wound part of a belt, and driving torque.

As shown in FIG. 3, how the driving torque for the pressurizing roller 50 changed with a change in the tension load on the fixing belt 12 was examined with respect to three values of the nip load, and a result of the examination shows that a point of inflection at which the driving torque begins increasing is found around the tension load of 30 N. The driving torque is preferably small because an increase in the driving torque causes slip or the like and thereby makes it impossible to drive and rotate the fixing belt 12 at a stable speed. As shown as a low-torque range in FIG. 3, the tension load on the fixing belt 12 is preferably 30 N or smaller (then the tension load W/the fixing belt width L is 107.9 N/m or smaller).

For the tension load on the fixing belt 12 of the belt-type fixing device 10 of the embodiment which load is represented as W [N] and the width of the fixing belt 12 which width is represented as L [m], the above results prove that W/L is preferably in the range from 18.0 to 107.9 [N/m], more preferably in a range from 28.8 to 107.9 [N/m], and further preferably in a range from 36.0 to 107.9 [N/m].

In the belt-type fixing device 10, it is to be noted that the fixing belt 12 is heated by the heating roller 14 that has the heater lamp 16 therein and that is configured as the rotatable supporting member; however, the device may be configured so that the fixing belt 12 is heated by a heat source provided in contact with or adjacent to the fixing belt 12 at a location other than that of the heating roller.

In place of the heating roller 14 may be used a supporting member that cannot be rotated. In such an arrangement, the supporting member that cannot be rotated may be a sheet-like heater.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A belt-type fixing device for fixing a toner image on a paper, the belt-type fixing device comprising:

an endless-sheet-like belt member, a pressurizing roller which has an elasticity and on which the paper is passed through a fixing nip that is contact part between the pressurizing roller and an outer circumferential surface of the belt member, a nip forming member that is harder than the pressurizing roller, that is positioned inside the belt member, that relatively presses the belt member against the pressurizing roller, and that has a pressing surface opposite to the pressurizing roller and formed of a curved surface extending along an outer circumferential surface of the pressurizing roller, and a spring that provides the belt member with a tension such that, for a tension load W [N] and a width L [m] of the belt member, W/L is in a range from 18.0 to 107.9 [N/m].

2. A belt-type fixing device as claimed in claim 1, wherein the tension that is provided for the belt member by the springs is in the range from 28.8 to 107.9 [N/m].

3. A belt-type fixing device as claimed in claim 1, wherein the tension that is provided for the belt member by the springs is in a range from 36.0 to 107.9 [N/m].

4. A belt-type fixing device as claimed in claim 1, wherein the pressurizing roller is driven to rotate, and wherein the belt member follows the pressurizing roller so as to rotate.

5. A belt-type fixing device comprising an endless-sheet-like fixing belt to be heated that is wound around a supporting member which is provided so as to be capable or incapable of rotating and around a nip forming member which is fixed so as to be incapable of rotating, and a pressurizing roller that can be driven to rotate and that is in pressure contact with the nip forming member with the fixing belt interposed between, wherein contact part between the fixing belt and the pressurizing roller forms a fixing nip, and, for a tension load W [N] on the fixing belt which is driven and rotated by the pressurizing roller and, a width L [m] of the fixing belt, W/L is set in a range from 18.0 to 107.9 [N/m].

6. A belt-type fixing device as claimed in claim 1, wherein a mean pressure in the fixing nip is in a range from 50 to 250 kPa.

7. A belt-type fixing device as claimed in claim 1, wherein a surface of the nip forming member that is opposite to the pressurizing roller is configured as a curved surface extending along an outer circumferential surface of the pressurizing roller so that a pressure distribution in the fixing nip is made generally flat with respect to a paper feeding direction.

8. A belt-type fixing device as claimed in claim 7, wherein a radius R of curvature of the curved surface of the nip forming member preferably satisfies a following expression:

$$\text{radius of pressurizing roller} \leqq R \leqq \text{radius of pressurizing roller} \times 1.3.$$

9. A belt-type fixing device as claimed in claim 1, wherein the supporting member is a rotatable heating roller having a heat source, and an arbitrary point on an inner surface of the fixing belt abuts on the heating roller for 0.2 second or longer in one revolution of the fixing belt.

* * * * *